J. RANK.
GREASE CUP.
APPLICATION FILED APR. 6, 1908.

901,039.

Patented Oct. 13, 1908.

WITNESSES

INVENTOR
JOHN RANK
BY Paul & Paul
HIS ATTORNEYS

UNITED STATES PATENT OFFICE.

JOHN RANK, OF MINNEAPOLIS, MINNESOTA.

GREASE-CUP.

No. 901,039.   Specification of Letters Patent.   Patented Oct. 13, 1908.

Application filed April 6, 1908. Serial No. 425,296.

*To all whom it may concern:*

Be it known that I, JOHN RANK, of Minneapolis, Hennepin county, Minnesota, have invented certain new and useful Improvements in Grease-Cups, of which the following is a specification.

My invention relates to grease cups designed particularly for use on moving bearings such as crank pins and eccentrics, and the object of the invention is to provide a cup having means for a positive and reliable feed of the grease, and also having means by means of which the feed may be regulated.

The invention consists generally in various constructions and combinations, all as hereinafter described and particularly pointed out in the claims.

Figure 1:
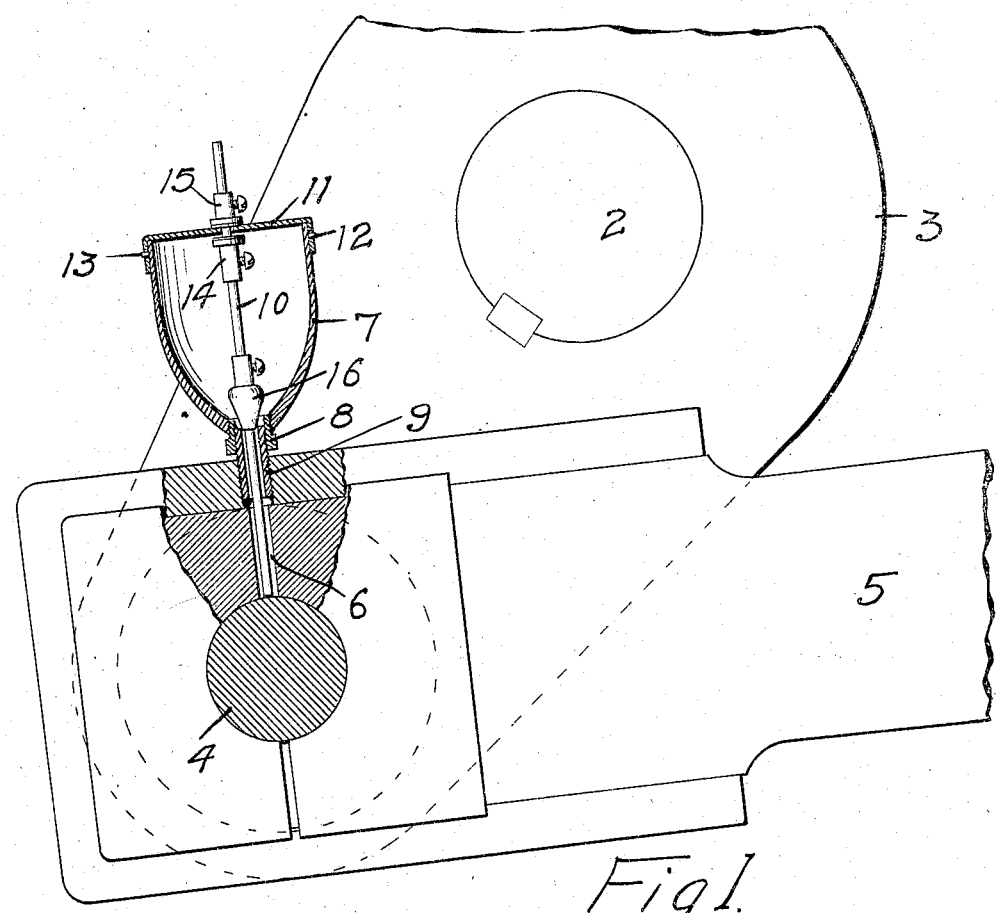
Figure 2:
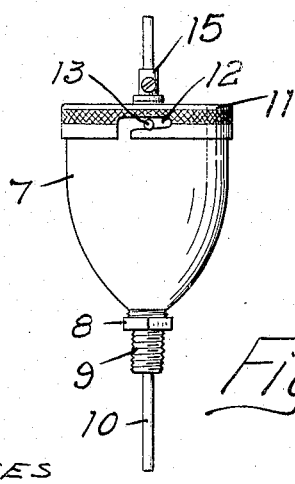
Figure 3:
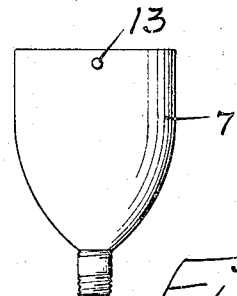

In the accompanying drawings, forming part of this specification, Figure 1 is a detail view partially in section illustrating the application of my grease cup to a crank pin bearing. Fig. 2 is a side view of the cup removed from the bearing. Fig. 3 is a detail view illustrating the manner of fitting a nipple into the bottom of the cup.

In the drawing 2 represents a shaft, 3 a crank secured thereon, 4 a crank pin and 5 a pitman or connecting rod. A passage 6 is provided in the bearing of the rod leading to the pin 4.

7 is a cup, conical in form having a bushing 8 fitted into its lower end, and a nipple 9 with one end inserted into said bushing and the other end tapped into the bearing of the crank pin above the passage 6.

10 is a rod preferably of copper having its lower end within the passage 6 and contacting with the crank pin, and its upper end passing through a cover 11 that is mounted on the cup and provided with bayonet slots 12 to receive pins 13. An adjustable collar 14 is mounted on the rod 10 below the cover and a similar collar 15 is mounted on the rod above the cover. The weight of the rod causes the collar 15 to rest on the cover and the position of the collar 14 determines the degree of movement of the rod 10 as it is thrown back and forth with the revolution of the crank pin. By adjusting the collar 14 up and down upon the rod the throw of the rod 10 may be regulated. Below the collar 14 is a cone 16 also adjustable on the rod 10 and adapted to fit into the upper end of the bushing 8 and close the passage therethrough. By moving this cone up and down on the rod I am able to regulate the volume of grease fed to the bearing.

In adjusting the device preparatory to use I secure the cone 16 on the rod and allow it to drop down into the bushing. Then the collars 14 and 15 are put in place and by lifting the collar 15 the rod and the cone 16 will be raised also and the distance between the collar 15 and the cover will indicate the space between the cone and its seat in the bushing. I am thus able to accurately adjust the feed of the cup.

The throw of the rod 10 or its stroke lengthwise is determined by the adjustment of the collar 14 when the cup is filled with grease. The rod will act as a contacting means and insure the delivery of the grease to the bearing. I make no claim particularly herein to the rod for this purpose, as it is old in devices of this kind, my invention residing in the attachment of the rod.

It is frequently necessary to provide different sizes of fittings for mounting a grease cup of this kind. I have therefore, as indicated in Fig. 1, provided means whereby a bushing may be utilized, or as shown in Fig. 3, the nipple may be tapped directly into the base of the cup. I am thus able to adapt the fittings for the different sizes of holes in the bearing on which the cup is to be used.

The rod may be adjusted in contact with the bearing or out of contact therewith as desired, and the degree of movement of the rod may be regulated by the adjustable collars. In some instances I may prefer to make the rod rigid, as in a fast moving bearing, so that there will be no longitudinal movement of the rod in the revolution of the crank pin and the cup.

I claim as my invention:

1. The combination, with a movable bearing, of a grease cup mounted thereon and having a suitable cover, a rod arranged within said cup and extending down into said bearing and up through said cover, and means on said rod above and below said cover whereby said rod is held rigid or permitted a limited longitudinal movement in the revolution of the bearing.

2. The combination, with a movable bearing, of a grease cup mounted thereon and having a suitable cover, a rod mounted in said cup and bearing, and collars adjustably mounted on said rod above and below said cover, and whereby said rod is held rigid or permitted to move longitudinally, for the purpose specified.

3. The combination, with a bearing, of a grease cup mounted thereon and having a passage leading to said bearing, a rod arranged within said cup and bearing and having a longitudinal movement, a cone adjustably mounted on said rod and adapted to regulate the feed of the grease through said passage, a cover for said cup through which said rod extends, and a collar adjustably mounted on said rod above said cover, and by means of which the adjustment of said cone and the feed of the grease may be determined.

4. A grease cup, having a cover and a threaded discharge opening in its lower end, an interiorly threaded bushing fitting within said opening and having flattened surfaces for application of a wrench thereto, said bushing being interiorly threaded, a nipple fitting within said bushing and having a lower threaded end to enter a bearing and a rod adapted to slide in said nipple and through an opening in said cover and having a cone to close the passage through said nipple, substantially as described.

In witness whereof, I have hereunto set my hand this 31st day of March 1908.

JOHN RANK.

Witnesses:
RICHARD PAUL,
J. A. BYINGTON.